United States Patent
Liu et al.

(10) Patent No.: US 10,638,518 B2
(45) Date of Patent: Apr. 28, 2020

(54) RANDOM ACCESS METHOD, APPARATUS, AND SYSTEM

(71) Applicant: ZTE CORPORATION, Guangdong (CN)

(72) Inventors: Xu Liu, Guangdong (CN); Qian Dai, Guangdong (CN); Jianxun Ai, Guangdong (CN); Wei Zou, Guangdong (CN)

(73) Assignee: ZTE Corporation, Shenzhen, Guandong (CN)

( * ) Notice: Subject to any disclaimer, the term of this patent is extended or adjusted under 35 U.S.C. 154(b) by 101 days.

(21) Appl. No.: 15/761,793

(22) PCT Filed: Apr. 12, 2016

(86) PCT No.: PCT/CN2016/079065
§ 371 (c)(1),
(2) Date: Mar. 20, 2018

(87) PCT Pub. No.: WO2017/049894
PCT Pub. Date: Mar. 30, 2017

(65) Prior Publication Data
US 2018/0288808 A1     Oct. 4, 2018

(30) Foreign Application Priority Data
Sep. 21, 2015    (CN) .......................... 2015 1 0605274

(51) Int. Cl.
*H04W 74/08*    (2009.01)
*H04W 72/04*    (2009.01)
*H04W 74/00*    (2009.01)

(52) U.S. Cl.
CPC ... *H04W 74/0833* (2013.01); *H04W 72/0446* (2013.01); *H04W 74/006* (2013.01)

(58) Field of Classification Search
None
See application file for complete search history.

(56) References Cited

U.S. PATENT DOCUMENTS

| 2012/0077484 | A1  | 3/2012 | Ji |
| 2016/0143030 | A1* | 5/2016 | Lee .......................... H04L 5/00 370/329 |

(Continued)

FOREIGN PATENT DOCUMENTS

| CN | 102740407 A | 10/2012 |
| CN | 102740462 A | 10/2012 |

OTHER PUBLICATIONS

International Search Report dated Jul. 12, 2016 for International Application No. PCT/CN2016/079065, 5 pages.

(Continued)

*Primary Examiner* — Otis L Thompson, Jr.
(74) *Attorney, Agent, or Firm* — Knobbe Martens Olson & Bear LLP

(57) ABSTRACT

Provided are a random access method, apparatus and system. The method includes: receiving, by a user equipment, configuration information of a Physical Random Access Channel (PRACH) dedicated for a super real-time service and/or configuration information of a preamble dedicated for the super real-time service notified by a base station; and when the user equipment has the super real-time service and has a short Transmission Time Interval (TTI) support capability, by the user equipment, transmitting a preamble to the base station through a PRACH resource dedicated for the super real-time service or transmitting the preamble dedicated for the super real-time service to the base station according to the configuration information of the PRACH dedicated for the super real-time service and/or the configuration information of the preamble dedicated for the super (Continued)

real-time service, so as to trigger the base station to allocate a short TTI resource to the user equipment.

14 Claims, 4 Drawing Sheets

(56) References Cited

U.S. PATENT DOCUMENTS

| | | | | |
|---|---|---|---|---|
| 2016/0345206 | A1* | 11/2016 | Yerramalli | H04W 74/006 |
| 2016/0352482 | A1* | 12/2016 | Sun | H04L 5/0048 |
| 2016/0381589 | A1* | 12/2016 | Zhang | H04L 5/001 |
| | | | | 370/252 |
| 2017/0048727 | A1* | 2/2017 | Cho | H04L 1/0018 |
| 2017/0048891 | A1* | 2/2017 | Quan | H04W 48/16 |
| 2017/0238304 | A1* | 8/2017 | Ling | H04L 5/0037 |
| | | | | 370/336 |
| 2018/0019901 | A1* | 1/2018 | Choi | H04L 27/26 |
| 2018/0083749 | A1* | 3/2018 | Lee | H04L 5/0007 |
| 2018/0109994 | A1* | 4/2018 | Lee | H04W 68/005 |
| 2018/0167980 | A1* | 6/2018 | Shi | H04W 72/02 |
| 2018/0205534 | A1* | 7/2018 | Yi | H04L 5/1469 |
| 2018/0227958 | A1* | 8/2018 | Xiong | H04W 72/0406 |
| 2018/0263060 | A1* | 9/2018 | Tirronen | H04W 74/006 |
| 2018/0295653 | A1* | 10/2018 | Ashraf | H04W 4/00 |
| 2018/0332624 | A1* | 11/2018 | Patel | H04W 74/0833 |
| 2018/0343682 | A1* | 11/2018 | Tang | H04L 1/0006 |
| 2019/0007324 | A1* | 1/2019 | Sebire | H04W 28/02 |
| 2019/0045394 | A1* | 2/2019 | Takano | H04W 72/042 |
| 2019/0069312 | A1* | 2/2019 | Oh | H04W 72/04 |
| 2019/0074936 | A1* | 3/2019 | Lee | H04L 1/18 |
| 2019/0082433 | A1* | 3/2019 | Tang | H04W 72/044 |
| 2019/0090218 | A1* | 3/2019 | Noh | H04L 27/0006 |
| 2019/0173620 | A1* | 6/2019 | Oh | H04L 1/1819 |

OTHER PUBLICATIONS

Written Opinion of the International Searching Authority dated Jul. 12, 2016 for International Application No. PCT/CN2016/079065, 3 pages.

* cited by examiner

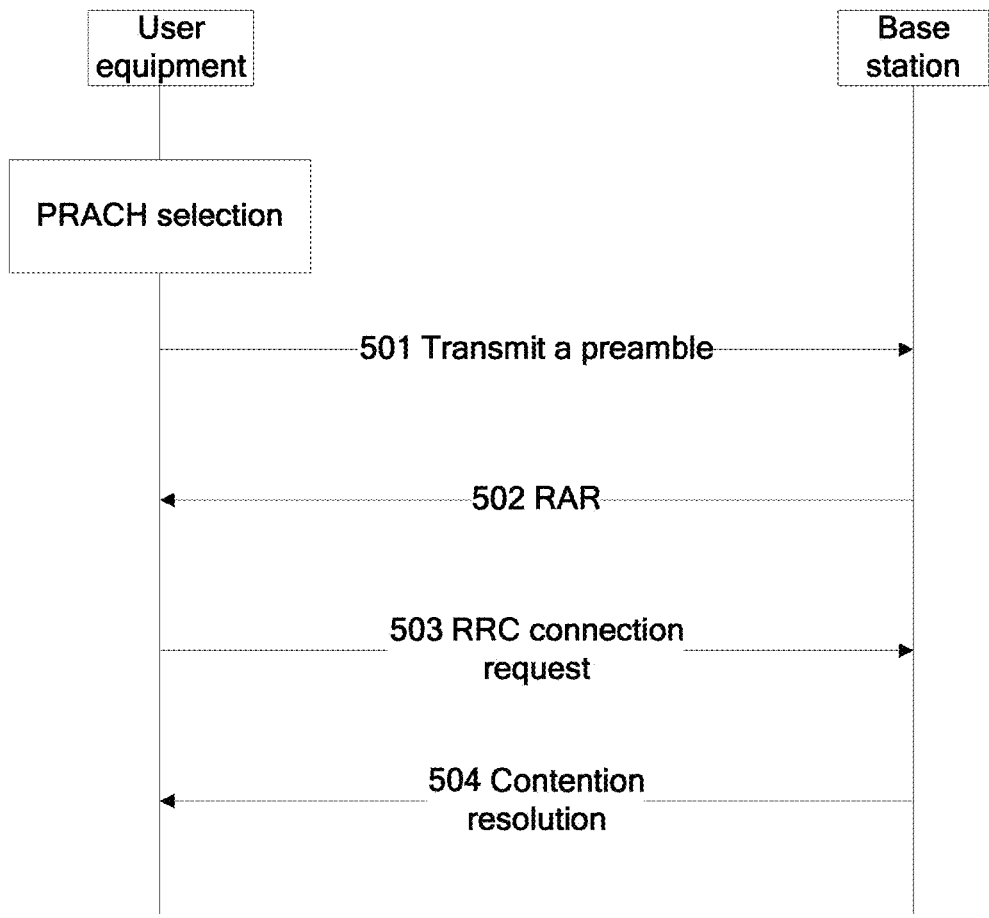

FIG. 5

A base station identifies a preamble transmitted from a user equipment

When the base station identifies that the preamble received is a preamble transmitted feom the user equipment through a PRACH resource dedicated for a super real-time service or a preamble dedicated for the super real-time service, the base station transmits the user equipment a RAR carried with resource allocation information for a short TTI

FIG. 6

RANDOM ACCESS METHOD, APPARATUS, AND SYSTEM

CROSS REFERENCE TO RELATED APPLICATIONS

This application is the U.S. National Phase Application under 35 U.S.C. § 371 of International Application No. PCT/CN2016/079065 filed on Apr. 12, 2016, designating the U.S. and published as WO 2017/049894A1 on Mar. 30, 2017, which claims the benefit of Chinese Patent Application No. 201510605274.8 filed on Sep. 21, 2015, which are hereby incorporated by reference in their entirety.

TECHNICAL FIELD

The present disclosure relates to wireless communication technology and, in particular, to a random access method, apparatus and system.

BACKGROUND

A rapid development of Mobile Internet, Internet of Things and other service applications has become a main driving force for the development of the fifth generation mobile communication technology (5G). There is an urgent demand for the 5G to have an access rate comparable to optical fibers, connectivity of 100 billion devices, perfect real-time experience, and wireless broadband access at all times and places. In addition, energy efficiency, spectral efficiency and peak rate and other important indicators also need to be considered in a 5G system design. The IMT-2020 (5G) Promotion Group for promoting the development of 5G technology is established in China in 2013. According to the overall situation in the world, it is estimated that 5G vision, key capability needs and spectrum plan will be formed in 2015; 5G standardization work will be started thereafter and 5G will be put into commercial use after 2020. In terms of international standards, the LTE-Advanced technical standards are mainly formulated by the 3rd Generation Partnership Project (3GPP) International Organization for Standardization. The industry initially believes that research on 5G standards will be started in 3GPP Release 14 (R14) (expected in 2016).

In future mobile network applications, the demand for traffic, the number of terminals and the types of terminals will all show an explosive growth trend. As one of 5G's important scenes and technologies, Machine Type Communication (MTC) is receiving more and more attention. In general, there are four major needs for MTC: massive connection, low power consumption, low delay and high reliability. Massive connection is reflected in that the number of MTC devices is currently more than 10 times the number of human-to-human communication terminals. Low energy consumption is reflected in that the significance of energy saving is extraordinary because of a large number of MTC devices. Low latency and high reliability are reflected in that MTC devices have an end-to-end delay of 1 ms or shorter. MTC devices often need to transmit super real-time service data, so that a data processing center can timely analyze and process the service data and make corresponding actions. Thus research on super real-time services and delays will be an important technical point in the MTC research process.

In a related Long Term Evolution (LTE) system, a random access process is triggered by three modes: mode 1: triggered by a Physical Downlink Control Channel (PDCCH); mode 2: triggered by a Media Access Control (MAC) layer; and mode 3: triggered by an upper layer. In mode 1, when downlink data arrives, if the user is in a connected state and already in an asynchronous state (out-of-synchronization), the user is triggered to initiate a radio resource control (RRC) reconnection process; and if the user is in an idle state, the user is triggered to initiate an initial random access process. In mode 2, when the user needs to send uplink data, but the user is out of synchronization or has no Physical Uplink Control Channel (PUCCH) resource required for sending a scheduling request (SR), the user is triggered to initiate an RRC connection reconfiguration process. In mode 3, the random access process triggered by the upper layer includes initial random access, RRC connection reestablishment and handover.

For a user equipment having a super real-time service, if data transmission and signaling interaction can be implemented by utilizing a resource whose transmission time interval (TTI) is less than 1 ms (i.e., a short TTI), then a transmission delay of the user data and a delay in signaling interaction can be effectively reduced. However, the related art does not provide the following solution: in the random access process, a base station is triggered to allocate a short TTI resource to a user equipment having the super real-time service, and the base station performs signaling interaction with the user equipment by utilizing the short TTI resource.

SUMMARY

The following is a summary of a subject matter described herein in detail. This summary is not intended to limit the scope of the claims.

An embodiment of the present disclosure provides a random access method, apparatus and system that enable a user equipment having a super real-time service and a short TTI support capability to trigger a base station in a random access process to allocate a short TTI resource to the user equipment.

An embodiment of the present disclosure provides a random access method. The method includes: receiving, by a user equipment, the following configuration information notified by a base station: configuration information of a Physical Random Access Channel (PRACH) dedicated for a super real-time service and/or configuration information of a preamble dedicated for the super real-time service; and when the user equipment has the super real-time service and has a short Transmission Time Interval (TTI) support capability, by the user equipment, transmitting a preamble to the base station through a PRACH resource dedicated for the super real-time service or transmitting the preamble dedicated for the super real-time service to the base station according to the configuration information of the PRACH dedicated for the super real-time service and/or the configuration information of the preamble dedicated for the super real-time service, so as to trigger the base station to allocate a short TTI resource to the user equipment.

An embodiment of the present disclosure further provides a random access method. The method includes: identifying, by a base station, a preamble transmitted from a user equipment; and when the base station identifies that the preamble received is a preamble transmitted from the user equipment through a Physical Random Access Channel (PRACH) resource dedicated for a super real-time service or a preamble dedicated for the super real-time service, transmitting, by the base station, a Random Access Response (RAR) carried with resource allocation information for a short Transmission Time Interval (TTI) to the user equipment.

An embodiment of the present disclosure further provides a random access apparatus provided in a user equipment. The random access apparatus includes: a first reception module configured to receive the following configuration information notified by a base station: configuration information of a Physical Random Access Channel (PRACH) dedicated for a super real-time service and/or configuration information of a preamble dedicated for the super real-time service notified by a base station; and a first transmission module configured to, when the user equipment has the super real-time service and has a short Transmission Time Interval (TTI) support capability, transmit a preamble to the base station through a PRACH resource dedicated for the super real-time service or transmit the preamble dedicated for the super real-time service to the base station according to the configuration information of the PRACH dedicated for the super real-time service and/or the configuration information of the preamble dedicated for the super real-time service, so as to trigger the base station to allocate a short TTI resource to the user equipment.

An embodiment of the present disclosure further provides a random access apparatus provided in a base station. The random access apparatus includes: a second reception module configured to identify a preamble transmitted from a user equipment; and a second transmission module configured to, when the second reception module identifies that the preamble received is a preamble transmitted from the user equipment through a Physical Random Access Channel (PRACH) resource dedicated for a super real-time service or a preamble dedicated for the super real-time service, transmit the user equipment a Random Access Response (RAR) carried with resource allocation information for a short Transmission Time Interval (TTI).

An embodiment of the present disclosure further provides a random access system. The system includes a user equipment and a base station. The user equipment is configured to receive configuration information of a Physical Random Access Channel (PRACH) dedicated for a super real-time service and/or configuration information of a preamble dedicated for the super real-time service notified by a base station; and when the user equipment has the super real-time service and has a short Transmission Time Interval (TTI) support capability, the user equipment is configured to transmit a preamble to the base station through a PRACH resource dedicated for the super real-time service or transmit the preamble dedicated for the super real-time service to the base station according to the configuration information of the PRACH dedicated for the super real-time service and/or the configuration information of the preamble dedicated for the super real-time service. The base station is configured to identify a preamble transmitted from a user equipment; and when the base station identifies that the preamble received is a preamble transmitted from the user equipment through a Physical Random Access Channel (PRACH) resource dedicated for a super real-time service or a preamble dedicated for the super real-time service, the base station is configured to transmit the user equipment a Random Access Response (RAR) carried with resource allocation information for a short Transmission Time Interval (TTI).

An embodiment of the present disclosure further provides a computer storage medium storing computer-executable instructions, where the computer-executable instructions, when being executed, are used for executing the above methods.

In an embodiment of the present disclosure, a user equipment receives configuration information of a Physical Random Access Channel (PRACH) dedicated for a super real-time service and/or configuration information of a preamble dedicated for the super real-time service notified by a base station; and when the user equipment has the super real-time service and has a short Transmission Time Interval (TTI) support capability, the user equipment transmits a preamble to the base station through a PRACH resource dedicated for the super real-time service or transmits the preamble dedicated for the super real-time service to the base station according to the configuration information of the PRACH dedicated for the super real-time service and/or the configuration information of the preamble dedicated for the super real-time service, so as to trigger the base station to allocate a short TTI resource to the user equipment. It can be seen that, in the present embodiment, through configuration of a PRACH or a preamble dedicated for a super real-time service, a user equipment having the super real-time service and a short TTI support capability can select the PRACH dedicated for the super real-time service or the preamble dedicated for the super real-time service in a random access process, so as to trigger a base station to use a short TTI resource in a subsequent signaling interaction and allocate the short TTI resource to the user equipment, thereby effectively reducing a delay in the user plane and the control plane to satisfy delay requirements of the user's super real-time service.

Other aspects can be understood after the accompanying drawings and detailed description are read and understood.

BRIEF DESCRIPTION OF DRAWINGS

FIG. 5 is a schematic diagram illustrating a random access process according to an embodiment of the present disclosure.

FIG. 6 is a flowchart illustrating another random access method according to an embodiment of the present disclosure.

DETAILED DESCRIPTION

Embodiments of the present disclosure will be described below in detail with reference to the accompanying drawings. It is to be understood that the embodiments described below are intended to illustrate and not to limit the present disclosure.

Figures 1, 2:
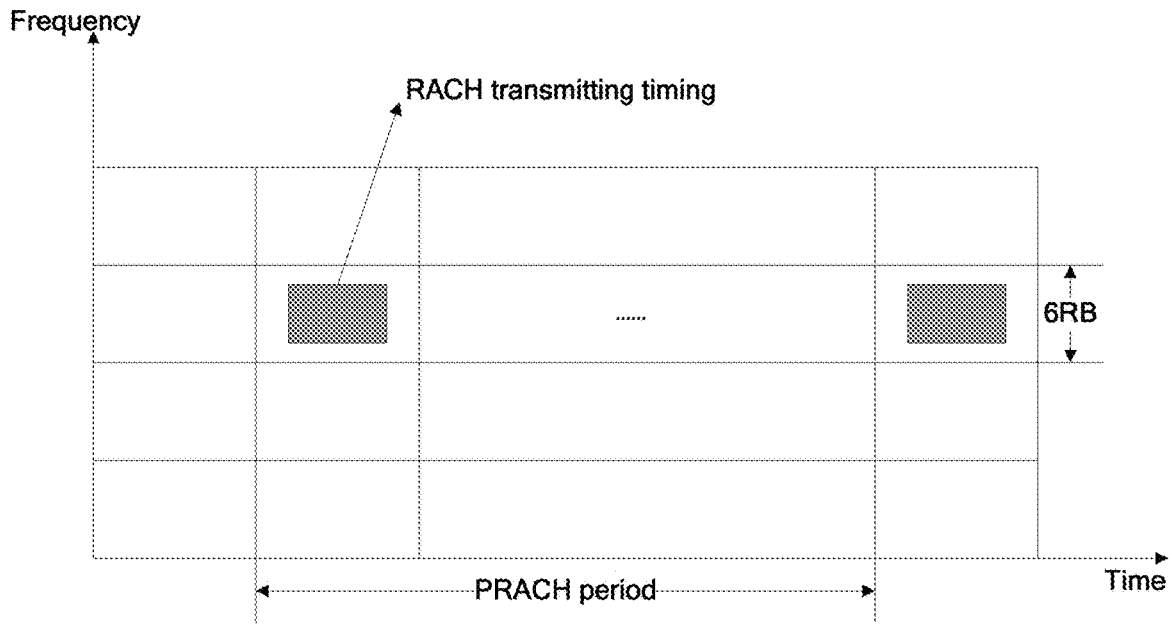
FIG. 1 is a schematic diagram illustrating time-frequency resource configuration of PRACH in a related LTE system.
FIG. 2 is a flowchart illustrating a random access method according to an embodiment of the present disclosure.

FIG. 2 is a flowchart illustrating a random access method according to an embodiment of the present disclosure. As shown in FIG. 2, the random access method according to the embodiment includes steps described below.

In step 11, a user equipment receives the following configuration information notified by a base station: configuration information of a Physical Random Access Channel (PRACH) dedicated for a super real-time service and/or configuration information of a preamble dedicated for the super real-time service.

Herein, the configuration information of the PRACH dedicated for the super real-time service indicates at least one of the following cases:

The PRACH dedicated for the super real-time service and an existing PRACH occupy a same time domain position the Transmission Time Interval (TTI) of which is 1 ms and occupy different frequency domain resource positions, and a frame structure for the PRACH dedicated for the super real-time service is a TTI of 1 ms;

The PRACH dedicated for the super real-time service and the existing PRACH occupy the same time domain position the TTI of which is 1 ms and occupy different frequency domain resource positions, and the frame structure for the PRACH dedicated for the super real-time service is a short TTI less than 1 ms;

The PRACH dedicated for the super real-time service and the existing PRACH occupy different time domain positions, and the frame structure for the PRACH dedicated for the super real-time service is the TTI of 1 ms; and The PRACH dedicated for the super real-time service and the existing PRACH occupy different time domain positions, and the frame structure for the PRACH dedicated for the super real-time service is the short TTI less than 1 ms.

Herein, the configuration information of the preamble dedicated for the super real-time service includes: an index of the preamble dedicated for the super real-time service in existing preambles for random access.

The super real-time service refers to the following service: a service indicator of the service indicates that a delay of a data packet is less than 50 ms. Optionally, in the LTE system, a Quality of Service (QoS) class identifier (QCI) is used for describing features of data transmission between a user and a Policy and Charging Enforcement Function (PCEF). The QCI requirement for the super real-time service is that a delay of the data packet is less than 50 ms.

In step 12, when the user equipment has the super real-time service and has a short TTI support capability, the user equipment transmits a preamble to the base station through a PRACH resource dedicated for the super real-time service or transmits the preamble dedicated for the super real-time service to the base station according to the configuration information of the PRACH dedicated for the super real-time service and/or the configuration information of the preamble dedicated for the super real-time service, so as to trigger the base station to allocate a short TTI resource to the user equipment.

An embodiment of the present disclosure further provides a random access method as shown in FIG. 6. The method includes the following steps: a base station identifies a preamble transmitted from a user equipment; and when the base station identifies that the preamble received is a preamble transmitted from the user equipment through a PRACH resource dedicated for a super real-time service or a preamble dedicated for the super real-time service, the base station transmits the user equipment a Random Access Response (RAR) carried with resource allocation information for a short Transmission Time Interval (TTI).

The resource allocation information for the short TTI is uplink authorization information for the short TTI carried by a MAC RAR control information unit in a Media Access Control Protocol Data Unit (MAC PDU) of the RAR.

Optionally, the method further includes the following step after the preamble transmitted from the user equipment is identified by the base station: determining, by the base station, a resource for transmitting the RAR according to short TTI support capabilities of all user equipments initiating a random access request. Optionally, when not all of user equipments initiating a random access request at a moment have short TTI support capabilities or when no short TTI resource exists in Physical Downlink Shared Channel (PDSCH) resources for transmitting the RAR at the moment, the base station transmits the RAR on a PDSCH resource the TTI of which is 1 ms; and when all of the user equipments initiating the random access requests at the moment have the short TTI support capabilities and a short TTI resource exists in the PDSCH resource for transmitting the RAR at the moment, the base station transmits the RAR on a PDSCH resource the TTI of which is less than 1 ms.

The present disclosure is described below in detail by using a number of embodiments.

Embodiment I

This embodiment describes a situation in which a PRACH dedicated for a super real-time service (hereinafter referred to as S-PRACH) is defined outside existing time-frequency resources of the PRACH. FIG. 1 is a schematic diagram illustrating time-frequency resource configuration of the PRACH in a related LTE system.

Figure 3A:
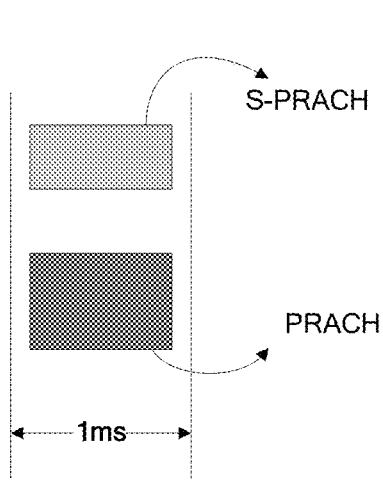
FIGS. 3a-3d are schematic diagrams illustrating time-frequency resources configuration of PRACH dedicated for a super real-time service according to an embodiment of the present disclosure.

Optionally, as shown in FIG. 3a, the S-PRACH and the existing PRACH occupy a same time domain position the TTI of which is 1 ms, and occupy different frequency domain resource positions. Moreover, a frame structure for the S-PRACH is a TTI of 1 ms.

Optionally, in the related LTE system, a Random Access-Radio Network Temporary Identifier (RA-RNTI) is used for identifying a time-frequency resource position used by the user equipment to transmit a preamble. RA-RNTI=$1+t\_id+10*f\_id$, where $t\_id$ denotes the number of the first subframe where the PRACH for transmitting the preamble is located, and $f\_id$ denotes an index, which is in the frequency domain, of the PRACH for transmitting the preamble in this subframe. In a Frequency Division Duplexing (FDD) system, $f\_id=0$. Therefore, in the case of such resource configuration of the S-PRACH and the PRACH, two user equipments may select different resource positions (e.g., one selects the S-PRACH and the other selects the PRACH), resulting in the same RA-RNTI. To avoid this situation, a calculation method of the RA-RNTI when the preamble is transmitted by utilizing the S-PRACH resource is defined as: S-RA-RNTI=$1+t\_id+10*f\_id+60$. However, the present embodiment is not limited to this calculation method. Any method that can differentiate between value ranges of time-frequency resources of the PRACH and the S-PRACH applies.

Figure 3B:
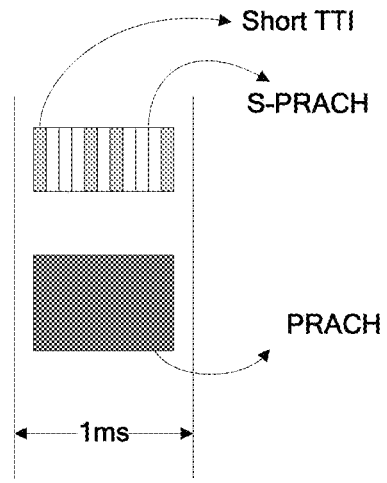

Optionally, as shown in FIG. 3b, the S-PRACH and the existing PRACH occupy the same time domain position the TTI of which is 1 ms and occupy different frequency domain resource positions, and the frame structure for the S-PRACH is a short TTI less than 1 ms. That is, in a PRACH time domain in which one TTI is 1 ms, the S-PRACH has multiple short TTI resources as time-domain resources of the S-PRACH.

In this configuration mode, not only time-frequency resource positions of PRACH and S-PRACH need to be differentiated, but also time-frequency resource positions of S-PRACH on short TTIs in a subframe of 1 ms (i.e., time-frequency positions of short TTIs (shown in shadow in FIG. 3b) for transmitting a preamble in the S-PRACH need to be differentiated). Herein, a calculation method of the RA-RNTI when a preamble is transmitted by utilizing the S-PRACH resource is defined as: S-RA-RNTI=1+(t_id+1) *10+s-t_id+10*f_id+60, where t_id denotes the number of the first subframe where the PRACH for transmitting the preamble is located, f-id denotes an index, which is in the frequency domain, of the PRACH for transmitting the preamble in this subframe, and s-t_id denotes the number of the subframe of the S-PRACH for transmitting the preamble. However, the present embodiment is not limited to this calculation method. Any method that can differentiate between value ranges of PRACH and S-PRACH resources applies.

Figure 3C:
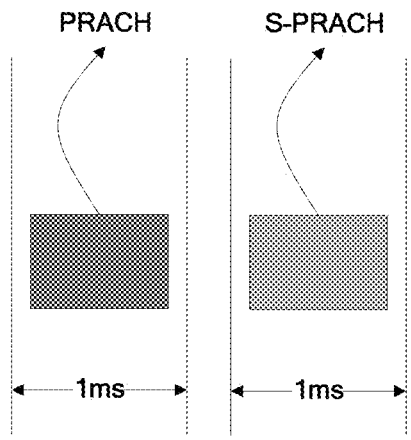

Optionally, as shown in FIG. 3c, the S-PRACH and the existing PRACH occupy different time domain positions, and the frame structure for the S-PRACH is the TTI of 1 ms.

In this configuration mode, a calculation method of the RA-RNTI when a preamble is transmitted by utilizing the S-PRACH resource is defined as: S-RA-RNTI=1+s-t_id+ 10*f_id+60, where f_id denotes an index, which is in the frequency domain, of the PRACH for transmitting the preamble, and s-t_id denotes the number of the subframe of the S-PRACH for transmitting the preamble. However, the present embodiment is not limited to this calculation method. Any method that can differentiate between value ranges of PRACH and S-PRACH resources applies.

Figure 3D:
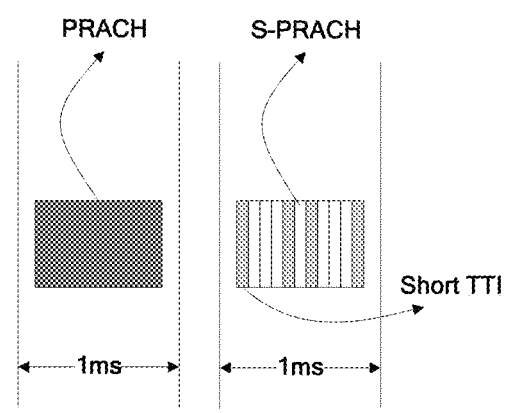

Optionally, as shown in FIG. 3d, the S-PRACH and the existing PRACH occupy different time domain positions, and the frame structure for the S-PRACH is the short TTI less than 1 ms. Part or all of short TTIs within 1 ms may be used as the time domain resource of the S-PRACH.

In this configuration mode, a calculation method of the RA-RNTI when a preamble is transmitted by utilizing the S-PRACH resource is defined as: S-RA-RNTI=1+t_id*10+ s-t_id+10*f_id+60, where t_id denotes the number of the first subframe where the PRACH for transmitting the preamble is located, f_id denotes an index, which is in the frequency domain, of the PRACH for transmitting the preamble in this subframe, and s-t_id denotes the number of the subframe of the S-PRACH for transmitting the preamble. However, the present embodiment is not limited to this calculation method. Any method that can differentiate between value ranges of PRACH and S-PRACH resources applies.

In this embodiment, a base station adds configuration information of the S-PRACH to a System Information Block-2 (SIB-2) and notifies the configuration information to all user equipments in a cell by broadcasting.

Embodiment II

In the present embodiment, some preambles of the existing preambles are selected to be used for mapping super real-time services.

In a LTE system, preambles for random access are carried on a PRACH. In order for a base station to acquire service feature information of a user equipment and reasonably allocate uplink authorized resources while the user equipment transmits a preamble, some preambles in 64 existing preambles for random access of one cell are selected for mapping super real-time services. Optionally, the system determines the proportion of the preambles selected for mapping the super real-time services according to the proportion of the number of user equipments having super real-time services and short TTI support capabilities to the total number of user equipments.

In the present embodiment, the base station adds configuration information of preambles dedicated for super real-time services to a System Information Block-2 (SIB-2), and notifies the configuration information to all user equipments in the cell by broadcasting. The configuration information of the preambles dedicated for the super real-time services includes indexes of the preambles dedicated for the super real-time service in existing preambles for random access, e.g., indexes of preambles for mapping super real-time services, which are selected from existing 64 preambles for random access of one cell.

Embodiment III

The present embodiment describes a manner of transmitting a Random Access Response (RAR) by a base station after the base station receives a preamble transmitted from a user equipment.

Optionally, after the base station receives the preamble transmitted from the user equipment, the base station transmits the RAR through one of the following manners:

The base station transmits the RAR to the user equipment on a subframe resource the TTI of which is 1 ms. Optionally, when not all of user equipments initiating a random access request at a moment have short TTI support capabilities or when no short TTI resource exists in Physical Downlink Shared Channel (PDSCH) resources for transmitting the RAR at the moment, the base station transmits the RAR on the subframe resource the TTI of which is 1 ms.

The base station transmits the RAR to the user equipment on a subframe resource the TTI of which is less than 1 ms. Optionally, when all of the user equipments initiating the random access requests at the moment have the short TTI support capabilities and a short TTI resource exists in the PDSCH resources for transmitting the RAR at the moment, the base station transmits the RAR on the subframe resource the TTI of which is less than 1 ms.

Figure 4:
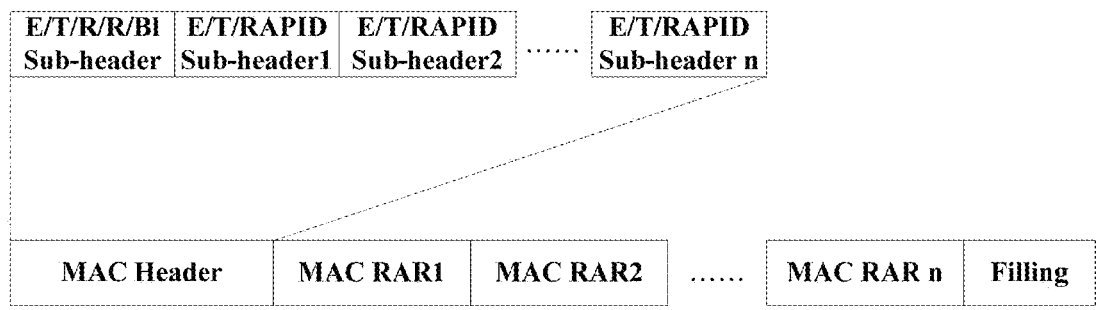
FIG. 4 is a schematic diagram illustrating composition of a Media Access Control Protocol Data Unit (MAC PDU) of a RAR according to an embodiment of the present disclosure.

Optionally, for a user equipment that utilizes a S-PRACH resource to transmit a preamble or selects a preamble dedicated for a super real-time service, a MAC RAR control information unit in a MAC PDU of the RAR transmitted from the base station is carried with uplink authorization information for a short TTI. FIG. 4 is a schematic diagram illustrating composition of the MAC PDU of the RAR according to the present embodiment.

Embodiment IV

The present embodiment describes a random access process after a preamble or a S-PRACH dedicated for a super real-time service is introduced. FIG. 5 is a schematic diagram of a random access process according to the present embodiment. As shown in FIG. 5, the present embodiment is described as follows:

In step 501, when a user equipment initiates a random access, the user equipment selects a proper PRACH resource (e.g., S-PRACH or normal PRACH) for transmitting a preamble or selects a proper preamble (e.g., a preamble dedicated for a super real-time service or a preamble dedicated for a non-super real-time service) so as to transmist the preamble to a base station.

In step 502, based on TTI support capabilities of all user equipments initiating a random access request at a moment, the base station selects a PDSCH resource the TTI of which is 1 ms or a PDSCH resource the TTI of which is less than 1 ms to transmit a RAR. For a user equipment that utilizes a preamble or a S-PRACH dedicated for a super real-time service, a MAC RAR control information unit in a MAC PDU of the base station is carried with uplink authorization information for a short TTI.

According to the calculation method of the RA-RNTI described in embodiment I, the user equipment detects whether there is a corresponding RA-RNTI on a Physical Downlink Control Channel (PDCCH). If there is a corresponding RA-RNTI, then the user equipment reads a RAR message on a PDSCH according to instructions on the PDCCH.

In step 503, since it is possible that multiple user equipments select the same random access resource to transmit the preamble in step 501, i.e., a conflict occurs in step 501. To resolve the conflict, the user equipment needs to utilize the resources allocated in step 502 to transmit a RRC connection establishment message carried with the identifier (ID) of the user equipment.

In step 504, the base station transmits a contention resolution message. If an ID for contention elimination contained in a control message of the MAC PDU matches an ID for contention elimination transmitted from the user equipment, the contention succeeds. If the user equipment selects the preamble or the S-PRACH dedicated for the super real-time service in step 501, then the base station can select a short TTI resource to transmit the message so as to reduce the delay in signaling transmission.

An embodiment of the present disclosure further provides a computer storage medium for storing computer-executable instructions, where the computer-executable instructions, when being executed, are used for executing the above methods.

Figure 7:
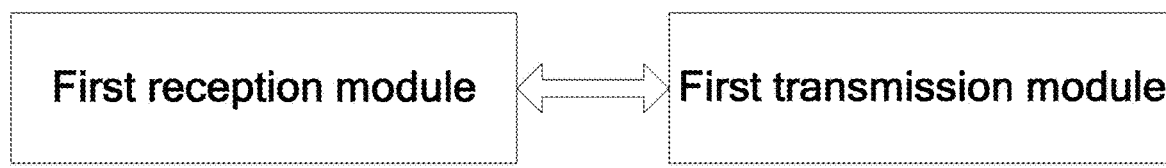
FIG. 7 is a block diagram illustrating a random access apparatus provided in a user equipment according to an embodiment of the present disclosure.

Moreover, an embodiment of the present disclosure further provides a random access apparatus provided in a user equipment. As shown in FIG. 7, the random access apparatus includes: a first reception module configured to receive the following configuration information notified by a base station: configuration information of a Physical Random Access Channel (PRACH) dedicated for a super real-time service and/or configuration information of a preamble dedicated for the super real-time service; and a first transmission module configured to, when the user equipment has the super real-time service and has a short Transmission Time Interval (TTI) support capability, transmit a preamble to the base station through a PRACH resource dedicated for the super real-time service or transmit the preamble dedicated for the super real-time service to the base station according to the configuration information of the PRACH dedicated for the super real-time service and/or the configuration information of the preamble dedicated for the super real-time service, so as to trigger the base station to allocate a short TTI resource to the user equipment.

Optionally, the configuration information of the PRACH dedicated for the super real-time service indicates at least one of the following cases:

The PRACH dedicated for the super real-time service and an existing PRACH occupy a same time domain position the TTI of which is 1 ms and occupy different frequency domain resource positions, and a frame structure for the PRACH dedicated for the super real-time service is a TTI of 1 ms;

The PRACH dedicated for the super real-time service and the existing PRACH occupy the same time domain position the TTI of which is 1 ms and occupy different frequency domain resource positions, and the frame structure for the PRACH dedicated for the super real-time service is a short TTI less than 1 ms;

The PRACH dedicated for the super real-time service and the existing PRACH occupy different time domain positions, and the frame structure for the PRACH dedicated for the super real-time service is a TTI of 1 ms; and The PRACH dedicated for the super real-time service and the existing PRACH occupy different time domain positions, and the frame structure for the PRACH dedicated for the super real-time service is the short TTI less than 1 ms.

Optionally, the configuration information of the preamble dedicated for the super real-time service includes: an index of the preamble dedicated for the super real-time service in existing preambles for random access.

Optionally, the super real-time service refers to the following service: a service indicator of the service indicates that a delay of a data packet is less than 50 ms.

Figure 8:
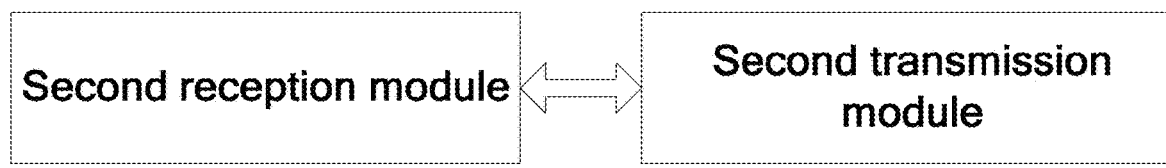
FIG. 8 is a block diagram illustrating a random access apparatus provided in a base station according to an embodiment of the present disclosure.

Moreover, an embodiment of the present disclosure further provides a random access apparatus provided in a base station. As shown in FIG. 8, the random access apparatus includes: a second reception module configured to identify a preamble transmitted from a user equipment; and a second transmission module configured to, when the second reception module identifies that the received preamble is a preamble transmitted from the user equipment through a Physical Random Access Channel (PRACH) resource dedicated for a super real-time service or a preamble dedicated for the super real-time service, transmit the user equipment a Random Access Response (RAR) carried with resource allocation information for a short Transmission Time Interval (TTI).

The resource allocation information for the short TTI is uplink authorization information for a short TTI carried by a MAC RAR control information unit in a MAC PDU of the RAR.

Optionally, the second transmission module is further configured to determine a resource for transmitting the RAR according to short TTI support capabilities of all user equipments initiating a random access request. Optionally, when not all of user equipments initiating a random access request at a moment have short TTI support capabilities or when no short TTI resource exists in Physical Downlink Shared Channel (PDSCH) resources for transmitting the RAR at the moment, the RAR is transmitted on a PDSCH resource the TTI of which is 1 ms; and when all of the user equipments initiating the random access requests at the moment have the short TTI support capabilities and a short TTI resource exists in the PDSCH resource for transmitting the RAR at the moment, the RAR is transmitted on a PDSCH resource the TTI of which is less than 1 ms.

In practical use, for example, the first reception module and the second reception module are communication elements having information receiving capabilities, such as a receiver; and for example, the first transmission module and the second transmission module are communication elements having information transmission capabilities, such as a transmitter. However, the present disclosure is not limited to this. The above modules are, for example, combinations of software and/or hardware capable of implementing preset functions.

Moreover, an embodiment of the present disclosure further provides a random access system including a user equipment and a base station.

The user equipment is configured to receive the following configuration information notified by a base station: configuration information of a Physical Random Access Channel (PRACH) dedicated for a super real-time service and/or configuration information of a preamble dedicated for the super real-time service; and when the user equipment has the super real-time service and has a short Transmission Time Interval (TTI) support capability, the user equipment is configured to transmit a preamble to the base station through a PRACH resource dedicated for the super real-time service or transmit the preamble dedicated for the super real-time service to the base station according to the configuration information of the PRACH dedicated for the super real-time service and/or the configuration information of the preamble dedicated for the super real-time service.

The base station is configured to identify the preamble transmitted from the user equipment; and when the base station identifies that the preamble received is a preamble transmitted from the user equipment through a Physical Random Access Channel (PRACH) resource dedicated for a super real-time service or a preamble dedicated for the super real-time service, the base station is configured to transmit the user equipment a Random Access Response (RAR) carried with resource allocation information for a short Transmission Time Interval (TTI).

The processing procedure of the above apparatuses and system is the same as that of the above method, and thus will not be repeated herein.

The integrated modules described in the present disclosure may also be stored in a computer-readable storage medium if implemented in the form of software function modules and sold or used as independent products. Based on this understanding, solutions provided by embodiments of the present disclosure substantially, or the part contributing to the related art, may be embodied in the form of a software product. The software product is stored on a storage medium and includes several instructions for enabling a computer device (which may be a personal computer, a server or a network device) to execute all or part of the methods provided by embodiments of the present disclosure. The foregoing storage medium may be a U disk, a mobile hard disk, a read only memory (ROM), a random access memory (RAM), a magnetic disk, an optical disk or another medium that can store program codes. In this way, embodiments of the present disclosure are not limited to any specific combination of hardware and software.

The above illustrates basic principles, main features and advantages of the present disclosure. The present disclosure is not limited to the above embodiments. The above embodiments and specification describe only the principle of the present disclosure. Various modifications and improvements may be made in the present disclosure without departing from the spirit and scope of the present disclosure. These modifications and improvements are within the scope of the present disclosure.

INDUSTRIAL APPLICABILITY

The above solutions effectively reduce a delay in the user plane and the control plane to satisfy delay requirements of the user's super real-time service.

What is claimed is:

1. A random access method, comprising:
receiving, by a user equipment, configuration information notified by a base station including: configuration information of a Physical Random Access Channel (PRACH) dedicated for a super real-time service and/or configuration information of a preamble dedicated for the super real-time service; and
in response to determining that the user equipment includes the super real-time service and includes a short Transmission Time Interval (TTI) support capability, by the user equipment, performing, according to the configuration information of the PRACH dedicated for the super real-time service and/or the configuration information of the preamble dedicated for the super real-time service, at least one of transmitting a preamble to the base station through a PRACH resource dedicated for the super real-time service and transmitting the preamble dedicated for the super real-time service to the base station, so as to trigger the base station to allocate a short TTI resource to the user equipment by a Random Access Response (RAR) carried with resource allocation information for a short TTI;
wherein a resource for transmitting the RAR is determined, according to short TTI support capabilities of all user equipment initiating a random access request, by the base station as follows:
in response to determining that not all of user equipment initiating the random access request at a moment have short TTI support capabilities or in response to determining that no short TTI resource exists in Physical Downlink Shared Channel (PDSCH) resources for transmitting the RAR at the moment, transmitting, by the base station, the RAR on a PDSCH resource the TTI of which is 1 ms; and
in response to determining that all of the user equipment initiating the random access requests at the moment have the short TTI support capabilities and a short TTI resource exists in the PDSCH resource for transmitting the RAR at the moment, transmitting, by the base station, the RAR on a PDSCH resource the TTI of which is less than 1 ms.

2. The method according to claim 1, wherein the configuration information of the PRACH dedicated for the super real-time service indicates at least one of:
the PRACH dedicated for the super real-time service and an existing PRACH occupy a same time domain position the TTI of which is 1 ms and occupy different frequency domain resource positions, and a frame structure for the PRACH dedicated for the super real-time service is the TTI of 1 ms;
the PRACH dedicated for the super real-time service and the existing PRACH occupy the same time domain position the TTI of which is 1 ms and occupy different frequency domain resource positions, and the frame structure for the PRACH dedicated for the super real-time service is a short TTI less than 1 ms;
the PRACH dedicated for the super real-time service and the existing PRACH occupy different time domain positions, and the frame structure for the PRACH dedicated for the super real-time service is the TTI of 1 ms; and
the PRACH dedicated for the super real-time service and the existing PRACH occupy different time domain positions, and the frame structure for the PRACH dedicated for the super real-time service is the short TTI less than 1 ms.

3. The method according to claim 1, wherein the configuration information of the preamble dedicated for the super real-time service comprises:
an index of the preamble dedicated for the super real-time service in existing preambles for random access.

4. The method according to claim 1, wherein the super real-time service refers to the following service: a service indicator of the service indicates that a delay of a data packet is less than 50 ms.

5. A random access method, comprising:
  identifying, by a base station, a preamble transmitted from a user equipment;
  in response to determining that the base station identifies that the preamble received is at least one of a preamble transmitted from the user equipment through a Physical Random Access Channel (PRACH) resource dedicated for a super real-time service and a preamble dedicated for the super real-time service, transmitting, by the base station, the user equipment a Random Access Response (RAR) carried with resource allocation information for a short Transmission Time Interval (TTI); and
  determining, by the base station, a resource for transmitting the RAR according to short TTI support capabilities of all user equipment initiating a random access request after the preamble transmitted from the user equipment is identified by the base station;
  wherein determining, by the base station, a resource for transmitting the RAR according to short TTI support capabilities of all user equipment initiating a random access request comprises:
  in response to determining that not all of user equipment initiating the random access request a moment have short TTI support capabilities or in response to determining that no short TTI resource exists in Physical Downlink Shared Channel (PDSCH) resources for transmitting the RAR at the moment, transmitting, by the base station, the RAR on a PDSCH resource the TTI of which is 1 ms; and
  in response to determining that all of the user equipment initiating the random access requests at the moment have the short TTI support capabilities and a short TTI resource exists in the PDSCH resource for transmitting the RAR at the moment, transmitting, by the base station, the RAR on a PDSCH resource the TTI of which is less than 1 ms.

6. The method according to claim 5, wherein the resource allocation information for the short TTI is uplink authorization information for the short TTI carried by a MAC RAR control information unit in a Media Access Control Protocol Data Unit (MAC PDU) of the RAR.

7. A random access apparatus provided in a user equipment, comprising a processor and a storage device storing computer executable instructions that, when executed by the processor, cause the processor to perform the following method:
  receiving configuration information notified by a base station, including configuration information of a Physical Random Access Channel (PRACH) dedicated for a super real-time service and/or configuration information of a preamble dedicated for the super real-time service; and
  in response to determining that the user equipment includes the super real-time service and includes a short Transmission Time Interval (TTI) support capability, performing, according to the configuration information of the PRACH dedicated for the super real-time service and/or the configuration information of the preamble dedicated for the super real-time service, at lease one of: transmitting the preamble to the base station through a PRACH resource dedicated for the super real-time service and transmitting the preamble dedicated for the super real-time service to the base station, so as to trigger the base station to allocate a short TTI resource to the user equipment by a Random Access Response (RAR) carried with resource allocation information for a short TTI;
  wherein a resource for transmitting the RAR is determined, according to short TTI support capabilities of all user equipment initiating a random access request, by the base station as follows:
  in response to determining that not all of user equipment initiating the random access request at a moment have short TTI support capabilities or in response to determining that no short TTI resource exists in Physical Downlink Shared Channel (PDSCH) resources for transmitting the RAR at the moment, transmitting, by the base station, the RAR on a PDSCH resource the TTI of which is 1 ms; and
  in response to determining that all of the user equipment initiating the random access requests at the moment have the short TTI support capabilities and a short TTI resource exists in the PDSCH resource for transmitting the RAR at the moment, transmitting, by the base station, the RAR on a PDSCH resource the TTI of which is less than 1 ms.

8. The apparatus according to claim 7, wherein the configuration information of the PRACH dedicated for the super real-time service indicates at least one of:
  the PRACH dedicated for the super real-time service and an existing PRACH occupy a same time domain position the TTI of which is 1 ms and occupy different frequency domain resource positions, and a frame structure for the PRACH dedicated for the super real-time service is the TTI of 1 ms;
  the PRACH dedicated for the super real-time service and the existing PRACH occupy the same time domain position the TTI of which is 1 ms and occupy different frequency domain resource positions, and the frame structure for the PRACH dedicated for the super real-time service is a short TTI less than 1 ms;
  the PRACH dedicated for the super real-time service and the existing PRACH occupy different time domain positions, and the frame structure for the PRACH dedicated for the super real-time service is the TTI of 1 ms; and
  the PRACH dedicated for the super real-time service and the existing PRACH occupy different time domain positions, and the frame structure for the PRACH dedicated for the super real-time service is the short TTI less than 1 ms.

9. The apparatus according to claim 7, wherein the configuration information of the preamble dedicated for the super real-time service comprises:
  an index of the preamble dedicated for the super real-time service in existing preambles for random access.

10. The apparatus according to claim 7, wherein the super real-time service refers to the following service: a service indicator of the service indicates that a delay of a data packet is of less than 50 ms.

11. A random access apparatus provided in a base station, comprising a processor and a storage device storing computer executable instructions that, when executed by the processor, cause the processor to perform the steps in following method:
  identifying a preamble transmitted from a user equipment;
  in response to identifying that the preamble received is at least one of a preamble transmitted from the user equipment through a Physical Random Access Channel (PRACH) resource dedicated for a super real-time service and a preamble dedicated for the super real-time service, transmitting the user equipment a Random Access Response (RAR) carried with resource allocation information for a short Transmission Time Interval (TTI); and determining a resource for transmitting the RAR according to short TTI support capabilities of all user equipment initiating a random access request after the preamble transmitted from the user equipment is identified;

wherein determining a resource for transmitting the RAR according to short TTI support capabilities of all user equipment initiating a random access request comprises:

in response to determining that not all of user equipment initiating the random access request at a moment have short TTI support capabilities or in response to determining that no short TTI resource exists in Physical Downlink Shared Channel (PDSCH) resources for transmitting the RAR at the moment, transmitting, by the base station, the RAR on a PDSCH resource the TTI of which is 1 ms; and in response to determining that all of the user equipment initiating the random access requests at the moment have the short TTI support capabilities and a short TTI resource exists in the PDSCH resource for transmitting the RAR at the moment, transmitting, by the base station, the RAR on a PDSCH resource the TTI of which is less than 1 ms.

12. The apparatus according to claim 11, wherein the resource allocation information for the short TTI is uplink authorization information for the short TTI carried by a MAC RAR control information unit in a Media Access Control Protocol Data Unit (MAC PDU) of the RAR.

13. A random access system, comprising: a user equipment provided with a random access apparatus according to claim 7 and a base station.

14. A random access system, comprising: a base station provided with a random access apparatus according to claim 11 and a user equipment.

* * * * *

UNITED STATES PATENT AND TRADEMARK OFFICE
CERTIFICATE OF CORRECTION

PATENT NO. : 10,638,518 B2
APPLICATION NO. : 15/761793
DATED : April 28, 2020
INVENTOR(S) : Xu Liu It is certified that error appears in the above-identified patent and that said Letters Patent is hereby corrected as shown below:

On the Title Page

In Column 1, item (73), Assignee, Line 2, delete "Guandong" and insert --Guangdong--.

In the Claims

In Column 13, Line 44, Claim 7, delete "computer executable" and insert --computer-executable--.

In Column 13, Line 59, Claim 7, delete "lease" and insert --least--.

In Column 14, Lines 57-58, Claim 11, delete "computer executable" and insert --computer-executable--.

Signed and Sealed this
Tenth Day of September, 2024

Katherine Kelly Vidal
*Director of the United States Patent and Trademark Office*